United States Patent Office

3,460,967
Patented Aug. 12, 1969

3,460,967
SURFACE TREATMENT OF GLASSES
Richard W. Petticrew, Perrysburg, Ohio, assignor to Owens-Illinois, Inc., a corporation of Ohio
No Drawing. Filed Oct. 23, 1965, Ser. No. 504,201
Int. Cl. C03c *17/20;* C09k *1/36*
U.S. Cl. 117—62                                   9 Claims

ABSTRACT OF THE DISCLOSURE

Process for increasing the cathodoluminescent brightness of a glass screen having a surface crystallized layer of glass containing an in situformed phosphor, including contacting the glass with an alkaline solution such as alkali metal hydroxide at a temperature and for a period of time sufficient to increase the cathodoluminescent brightness after the excess alkaline solution has been removed; and then removing excess alkaline solution.

---

This invention relates broadly to the surface treatment of glasses and, more particularly, to a method of increasing the cathodoluminescent brightness, under electron bombardment, of a glass screen having a phosphor in its surface. Still more particularly the invention is concerned with a method of treating, for the above-stated purpose, a glass screen having or containing a surface-crystallized layer of glass holding an in situ-formed phosphor material.

It was suggested prior to the present invention (see Jones U.S. Patent 2,523,026) that the maintenance of fluorescent lamps containing an alumina-based phosphor as a coating on the surface of the lamp be improved by treating the phosphor with water or with hydrochloric or benzoic acids in order to remove most of the lithia impurity in the phosphor. The patentee states that "the fluorescent brightness is not visibly reduced" by the treatment. There is no disclosure of using alkaline solutions for the intended purpose.

In U.S. Patent 3,060,129 Hockstra et al. disclosed that the light output of luminescent alkaline-earth halophosphates activated with trivalent antimony or with trivalent antimony and bivalent manganese can be increased by washing the phosphor with an aqueous solution of an inorganic reducing acid having a pH of 0.9–2.0, e.g., phosphorous or sulfurous acid, removing particles having a grain size smaller than approximately two microns, and then either (a) rinsing with water to remove the reducing acid or (b) rinsing with hydrochloric acid to remove any calcium sulfite formed during washing with the reducing acid and finally with water to remove the hydrochloric acid.

Colborne in U.S. Patent 2,325,110 and Froelich et al. in U.S. Patent 2,575,755 disclose various techniques for increasing the luminosity and stability of phosphors. Thus, Colborne suggests that the operation of a cathode-ray tube having a luminescent screen be improved by incorporating in the screen mixture or by applying to the screen a compound of an alkali reducible to an oxide thereof, a hydroxide, halide, nitrate or organic salt of an alkali, and baking the tube to deposit a layer of an oxide of the alkali from the said compound upon the luminescent screen. Froelich et al. incorporate with the phosphor-forming ingredients, prior to firing, a hydroxide of an alkali metal or a salt thereof such as the phosphate, sulfate, nitrate, carbonate, borate and chloride.

The present invention is based on my discovery that the brightness of a fluorescent screen in an electron-discharge device such as a cathode-ray tube, more particularly the cathodoluminescent brightness, under electron bombardment, of a glass screen having a surface-crystallized layer of glass containing an in situ-formed phosphor, can be materially increased by contacting the said glass with an alkaline solution at a temperature and for a period of time sufficient to increase its brightness, specifically cathodoluminescent brightness, after the excess alkaline solution has been removed therefrom; and removing the excess alkaline solution form the treated glass, e.g., by washing.

The fluorescent screens conventionally employed in electron-discharge tubes such as cathode-ray tubes and the like utilize solid state-sintered phosphors. The problems involved in securing optimum brightness and stability from such screens are exemplified in the aforementioned prior-art patents. However, in the case of fluorescent screens of the kind involved in this invention, i.e., glass screens having a surface-crystallized layer of glass containing an in situ-formed phosphor, e.g., a zinc silicate or zinc silicate- type phosphor, or such a silicate activated with bivalent manganese, tetravalent titanium or tetravalent uranium, the problems are entirely different. This is especially true from the standpoint of securing optimum cathodoluminescent brightness from the initial fluorescent screen.

One reason for the difference in the problems encountered in the manufacture of the prior-art fluorescent screens and the present screens is because the glass holds the in situ-formed crystalline phosphor in a glassy matrix, thereby imparting physical strength and mechanical ruggedness to the layer of phosphor material contained therein. However, this glassy matrix and/or a thin layer of glass formed immediately below the phosphor and over the top of the underlying crystals may be responsible for the fact that often one does not obtain a fluorescent screen having as high an initial brightness as may be desired for certain commercial applications. One method of increasing this initial brightness is to apply a phosphor-forming film, followed by heat treatment, over the surface-crystallized glass containing the in situ-formed phosphor. However, in many cases the resulting improved brightness is still inadequate for many applications.

The present invention is one solution to the problem of achieving a further improvement in brightness from both uncoated (i.e., uncoated with an applied phosphor film) fluorescent glass screens of the kind with which this invention is concerned and such screens that have been coated with a phosphor film as briefly described in the preceding paragraph and more fully hereafter. This problem was not encountered by those prior-art investigators who were concerned with fluorescent screens comprised of solid state-sintered phosphors, and a teaching with regard to the one is in no sense of the word a teaching with respect to the other, especially since the phosphors are in an entirely different environment.

I am unable to explain with certainty why the treatment of a glass article, such as a screen or faceplate, of the kind with which this invention is concerned with an alkaline solution results in an increase in its cathodoluminescent brightness, especially in view of the fact that an acid-etching treatment was found to result in a diminution of cathodoluminescent brightness. However, the following comments and observations may be helpful to those skilled in the art in advancing a theoretical explanation.

In connection with the inventigations leading to the present invention and the inventions disclosed and claimed in the copending applications mentioned later herein, an extensive study was made of the zinc silicate glass system. During the course of this study it was surprisingly found that when glasses in this system, e.g., potassium-zinc silicate and calcium-aluminum-zinc silicate each containing about 0.5 percent MnO, were either lightly abraded or etched with an acid prior to a brightness measurement, then the abraded or the etched areas showed a cathodoluminescent brightness only about one-fifth that of the surrounding undistrubed areas, sometimes with an accompanying change of color. This suggested that (a) a thin-film phosphor was present on the surface and was removed by abrading or by acid-etching the glass surface and/or (b) the crystal phosphor in the glass was poisoned by impurities that were introduced by the abrading or acid-etching treatments.

Specimens of a calcium-aluminum-zinc silicate surface-crystallizable glass were spray-coated with a solution of zinc acetate in methanol and then subjected to a controlled heat treatment to produce a surface-crystallized glass. The specimens, prepared to exactly the right shape and size for an electron-diffraction sample holder, were then subjected to electron-diffraction analysis. Very clear ring patterns were produced from what appeared to be a uniform polycrystalline layer on the surface. An analysis of these data produced an exact match with the $\delta$ spacings and intensities of a manganese oxide ($Mn_3O_4$) spinel. This cubic spinel pattern was general with all specimens examined, except for a few areas that showed some lines corresponding to ZnO in addition to the spinel. No similarity was found between these patterns and the published patterns of any zinc silicate.

Since the presence of zinc silicate was positively identified by X-ray diffraction analysis and the luminescent properties of the specimens of calcium-aluminum-zinc silicate glasses containing 0.5 MnO seemed to be the same as manganese-activated zinc silicate, the weight of the evidence supported the conclusion that there must be a thin layer of some contamination on the surface of the specimens, possibly excess manganese oxide and zinc oxide. The subsequent discovery that soaking the samples in 3-normal NaOH, followed by washing, greatly improved the cathodoluminescent brightness further supported this conclusion. However, acid-etching or abrading the samples after they had been immersed in the sodium hydroxide solution still completely destroyed the cathodoluminescence of the samples, thus raising considerable doubt about the role of the aforementioned thin layer.

It was also found that, after treating with an alkaline solution (specifically an aqueous solution of sodium hydroxide), the calcium-aluminum-zinc silicate glass containing MnO gave a much sharper cubic spinel electron-diffraction pattern than before leaching. However, samples of the same glass composition containing no MnO, which had been sprayed with a methanol solution of zinc acetate and then subjected to a controlled heat-treatment to effect surface-crystallization, also gave a sharp spinel diffraction pattern. Since there was no manganese in the glass composition and apparently no manganese was added during the spraying process, this meant that the spinel phase that formed on the surface either was not a manganese compound or that considerable manganese was picked up during the heat treatment. Subsequent tests in clean-atmosphere furnaces also developed the spinel phase in the apparent absence of manganese. Hence it was concluded that the crystal phase formed on the surface either was not a manganese compound or that an appreciable amount of manganese was picked up by the surface by some obscure means not understood.

Surface-crystallized glass specimens that were acid-etched or abraded prior to electron-diffraction analysis showed no crystallinity, but instead a diffuse amorphous scattering. Further abrading, so that the crystals grown in the glass were exposed, gave (i.e., with the zinc silicate studied) a slight diffraction pattern of zinc silicate in addition to the diffuse background scattering. A distinct zinc silicate diffraction pattern could be obtained only when sufficient material had been ground away so that the subcrystals became exposed. Hence it was concluded that the cathodoluminescent phosphor not only was concentrated in a thin film on the surface but also that a thin layer of glass was formed immediately below the phosphor and over the top of the underlying crystals. Perhaps, then, the alkaline solution that is applied to the surface-crystallized glass in practicing this invention coacts, in a manner which is not understood, with both the glassy matrix and the phosphor material.

Whatever the theoretical explanation may be, the fact remains that in practicing the present invention a glass body having a surface-crystallized layer of glass containing or holding an in situ-formed phosphor is treated with an alkaline solution whereby the said layer is modified in such a way that increased cathodoluminescent brightness results after the excess alkaline solution has been removed.

Particularly useful as the alkaline-treating agents are the hydroxides of the alkali metals (sodium, potassium, lithium, cesium and rubidium), and ammonium hydroxide. Other examples of strong bases that may be used are solvent solutions of the alkali-metal alkoxides, aryls and amides, e.g., sodium and potassium methoxides, ethoxides, n-propoxides, isopropoxides and tert.-butoxides, sodium and potassium amides, phenyllithium, indenyllithium, lithium ethylphenylamide, lithium diphenylamide; and the salts, with alkali-forming metals (Group I-A and II-A metals) of alkanes, aralkanes, nitriles, amines, etc., dianiline calcium, ethyl sodium, etc. Such strong bases have been described as being salts, with an alkali-forming metal, of an acid having a p$Ka$ of from 15 to 75. Other strong bases that may be employed include solvent solutions of the strongly basic quaternary ammonium hydroxides, e.g., tetramethyl ammonium hydroxide, tetraethanol ammonium hydroxide, benzyl trimethyl ammonium hydroxide and others well known to those skilled in the art, and especially those quaternary ammonium hydroxides that are commercially available. One may employ water solutions of the foregoing strong bases that are at least partly soluble in water and decompose only slightly (if at all) in water. Solutions in an organic solvent, e.g., a lower alkanol such as methanol, ethanol, etc., may be used, as desired or as may be required. Preferably the alkaline solution employed is one having a basicity at least the equivalent of that of a 1-normal aqueous solution of sodium hydroxide.

Among the preferred alkaline treating solutions used in practicing this invention may be mentioned solutions, especially aqueous solutions, of the alkali-metal hydroxides and of ammonium hydroxide. Thus one may use aqueous solutions of sodium hydroxide having a normality between 3 and 9, more particularly between about 4 and about 8, and specifically about 6.

Any suitable means may be employed in contacting the glass to be treated with the alkaline-treating soltuion. Contacting can be effected by immersing the glass in the bath of the treating solution, which normally is preferred; or by spraying, brushing, padding or any of the other known means for applying liquids to a substrate. This step may be carried out continuously, semi-continuously or by batch operations.

The application temperature, that is, the temperature of the treating solution at the time the glass is contacted therewith (as by immersion, for example) is generally within the range of from about 110° F. up to the boiling point of the treating solution at atmospheric pressure. For instance, the temperature of the solution while the glass is immersed therein or otherwise contacted with the solution may be within the range of from about 120° F. to about 200° F., still more particularly from about 150° F. to about 170° F., and specifically about 160° F. The time of the treatment may range from 1 second or less to one hour or more, more particularly from 10 to 15 seconds to 10 to 15 minutes, the shorter periods of time being used at the higher temperatures. In other words, the duration of the treatment varies, in most cases, inversely with the application temperature of the treating solution. If desired, the glass to be treated may be preheated, e.g., up to the temperature of the treating solution, before the solution is applied thereto.

Good results have been obtained with particular glasses by immersing the glass to be treated in an aqueous solution of sodium hydroxide having a normality of about 6, the temperature of the said solution being about 160° F. while the glass was immersed therein, and the time of the treatment ranging from about 3 minutes to about 6 minutes. Thereafter the excess sodium hydroxide was removed from the treated glass by water-washing, specifically with pure (i.e., distilled) water. Deionized water can be used instead of distilled water, if desired.

To the best of my knowledge and belief, any glass article or body adapted for use as a fluorescent screen and having a surface-crystallized layer of glass holding (for instance, in a glassy matrix) and in situ-formed phosphor material can have its cathodoluminescent brightness increased by treating the glass with an alkaline solution in accordance with the present invention. Illustrative examples of such glasses are those produced by the controlled heat treatment of a surface-crystallizable (including potentially surface-crystallizable) glass consisting essentially potentially surface-crystallizable) glass consisting essentially of the following constituents calculated in weight percent on the oxide basis:

| | |
|---|---|
| $SiO_2$ | 40–60 |
| $Al_2O_3$ | 5–15 |
| ZnO | 15–35 |
| CaO | 0–24 |
| BaO | 0–20 |
| SrO | 0–10 |
| MgO | 0–10 |
| $Na_2O$ | 0–8 |
| $K_2O$ | 0–8 |
| $Li_2O$ | 0–2 | wherein the total $Na_2O+K_2O+Li_2O$ is no more than 8 weight percent, the total $CaO+BaO+SrO+MgO$ is within the range of from 6 to 36 weight percent and, when the total $Na_2O+K_2O+Li_2O$ is zero, then the total $CaO+BaO+SrO$ is at least 6 weight percent.

A more specific example of a glass within the foregoing ranges of approximate proportions is as follows:

Glass composition A:

| | |
|---|---|
| $SiO_2$ | 50.8 |
| $Al_2O_3$ | 8.2 |
| ZnO | 22.0 |
| CaO | 18.0 |
| SrO | 0.5 |
| $Li_2O$ | 0.5 |
| MnO | 0.5 |

In the above composition the MnO activator is 0.5% by weight of the total of the other components of the glass.

Numerous examples of other surface-crystallizable glasses, the constituents of which are within the broad ranges set forth in the second paragraph immediately preceding, are given in Table I and elsewhere in my copending application Ser. No. 311,639, filed Sept. 26, 1963, now abandoned and assigned to the same assignee as the present invention. Such glasses may be termed zinc-aluminum silicate glasses.

Another class of surface-crystallizable (including potentially surface-crystallizable) glass compositions that can be surface-crystallized (especially after having been surface-roughened) by means of a controlled heat treatment, and then treated with an alkaline solution in accordance with this invention to increase the cathodoluminescent brightness of the final product, comprises those consisting essentially of the following constituents calculated in weight percent on the oxide basis:

| | |
|---|---|
| $SiO_2$ | 45–60 |
| ZnO | 15–45 |
| $K_2O$ | 0–25 |
| $Na_2O$ | 0–25 | wherein the total $K_2O+Na_2O$ is at least 10 weight percent but less than 25 weight percent.

Within the scope of the above broad class of glasses set forth in the preceding paragraph, and which may be more broadly described as being zinc silicate glasses, are those glasses consisting essentially of the following constituents calculated in weight percent on the oxide basis:

| | |
|---|---|
| $SiO_2$ | 46–51 |
| ZnO | 28–37 |
| $Na_2O$ | 2–12 |
| $K_2O$ | 5–12 |
| CaO | 0–3 |
| $Al_2O_3$ | 0–4 |
| BaO | 0–2 |
| $Sb_2O_3$ | 0–0.2 |
| MnO | 0–0.5 | wherein the total $K_2O+Na_2O$ is at least 10 weight percent but not more than 17 weight percent.

More specific examples of zinc silicate glass compositions that can be surface-crystallized (especially after having been surface-roughened) by subjecting the glass to a controlled heat treatment, and the surface-crystallized glass containing in situ-formed phosphor material in its surface layer then treated in accordance with this invention to increase its cathodoluminescent brightness, are those containing or consisting essentially of the following oxides in weight percent (i.e., constituents calculated in weight percent on the oxide basis):

| Glass | $SiO^2$ | ZnO | $Na_2O$ | $K_2O$ | MnO | $Al_2O_3$ | CaO | MgO | BaO | $Sb_2O_3$ |
|---|---|---|---|---|---|---|---|---|---|---|
| B | 48.0 | 35.0 | 12.0 | 5.0 | 0.5 | | | | | |
| C | 50.5 | 28.8 | 2.0 | 8.0 | 0.5 | 4.0 | 2.75 | 1.2 | 2.75 | |
| D | 46.0 | 37.0 | 7.5 | 7.5 | 0.5 | | | | | 2.0 |
| E | 50.0 | 35.0 | 3.0 | 12.0 | 0.5 | | | | | |

Other examples of zinc silicate glasses which, in their surface-crystallized state, can be treated in accordance with this invention to improve their cathodoluminescent brightness are given in my copending application Ser. No. 486,197, filed Sept. 9, 1965, assigned to the same assignee as the present invention, and which by this cross-reference is made a part of the disclosure of the instant application.

Another group of in situ surface-crystallizable and cathodoluminescent, in situ surface-crystallized (surface semicrystallized) glass compositions or bodies which can be used as hereinbefore described in carrying the present invention into effect comprises those consisting essentially of the following oxides in weight percent:

| | |
|---|---|
| $SiO_2$ | 45–65 |
| MgO | 10–20 |
| ZnO | 0–30 |
| $Na_2O$ | 0–17 |
| $K_2O$ | 0–20 |
| $Li_2O$ | 0–3 |
| CaO | 0–10 |
| $TiO_2$ | 0–5 |
| $ZrO_2$ | 0–5 |
| MnO | 0–2 |
| $Cu_2O$ | 0–2 |
| CuO | 0–2 |
| $Sb_2O_3$ | 0–2 | and wherein the amount of $Na_2O+K_2O+Li_2O$ is at least 10 weight percent.

The surface-crystallizable glasses broadly described in the preceding paragraph yield cathodoluminescent (including potentially cathodoluminescent) glass bodies or articles having a crystalline-containing, more particularly a magnesium silicate-type, crystalline-containing, surface layer formed in situ. This surface-crystallized glass having an in situ-formed phosphor material held in a glassy matrix in its surface layer can be treated with an alkaline-treating agent in accordance with this invention to increase its cathodoluminescent brightness. Within this broad group of glass compositions are at least two sub-groups A and B which, based on their cathodoluminescent and other charatceristics, are not the full equivalent of each other.

SUB-GROUP A

The glass compositions in this sub-group consist essentially of the following oxides in weight percent:

| | |
|---|---|
| $SiO_2$ | 45–50 |
| $MgO$ | 10–15 |
| $ZnO$ | 25–30 |
| $Na_2O$ | 12–17 |
| $TiO_2$ | 0–5 |
| $ZrO_2$ | 0–5 |
| $MnO$ | 0–2 |
| $Cu_2O$ | 0–2 |
| $CuO$ | 0–2 |
| $Sb_2O_3$ | 0–2 |

SUB-GROUP B

The glass compositions in this sub-group consist essentially of the following oxides in weight percent:

| | |
|---|---|
| $SiO_2$ | 60–65 |
| $MgO$ | 10–20 |
| $Na_2O$ | 0–12 |
| $K_2O$ | 0–20 |
| $Li_2O$ | 0–3 |
| $CaO$ | 0–10 |
| $TiO_2$ | 0–5 |
| $ZrO_2$ | 0–5 |
| $MnO$ | 0–2 |
| $Cu_2O$ | 0–2 |
| $CuO$ | 0–2 |
| $Sb_2O_3$ | 0–2 | and wherein the amount of $Na_2O+K_2O+Li_2O$ is at least 10 weight percent.

A specific example of a surface-crystallizable glass composition within the scope of sub-group A is a composition consisting essentially of the following oxides in the following approximate weight percentages:

Glass composition F:

| | |
|---|---|
| $SiO_2$ | 45.0 |
| $MgO$ | 15.0 |
| $ZnO$ | 25.0 |
| $Na_2O$ | 15.0 |
| $MnO$ | a 0.2–1.0 | a Preferably about 0.5.

When this surface-crystallizable glass composition is subjected to controlled heat-treatment, there is obtained a cathodoluminescent, in situ surface-crystallized, glass composition which luminesces red when subjected to low-voltage electron bombardment.

A specific example of a surface-crystallizable glass composition within the scope of sub-group B is a composition consisting essentially of the following oxides in the specified approximate weight percentages:

Glass composition G:

| | |
|---|---|
| $SiO_2$ | 60.0 |
| $MgO$ | 10.0 |
| $K_2O$ | 20.0 |
| $CaO$ | 10.0 |
| $TiO_2$ | a 1–3 | a Preferably about 2.0.

When this surface-crystallizable glass composition is subjected to controlled heat-treatment, there is obtained a cathodoluminescent, in situ surface-crystallized, glass composition which luminesces blue when subjected to low-voltage electron bombardment.

Other examples of magnesium silicate or magnesium-silicate type glasses which, in their surface-crystallized state, can be treated in accordance with the present invention to improve their cathodoluminescent brightness are given in my copending application Ser. No. 486,215, filed Sept. 9, 1965, assigned to the same assignee as the present invention, and which by this cross-reference is made a part of the disclosure of the instant application.

Still another group of in situ surface-crystallizable and cathodoluminescent (including potentially cathodoluminescent) surface-crystallized glass compositions or bodies comprises those consisting essentially of the following oxides in weight percent:

| | |
|---|---|
| $CaO$ | 15–35 |
| $B_2O_3$ | 65–85 |
| $SiO_2$ | 0–10 |
| $Al_2O_3$ | 0–10 |
| $Na_2O$ | 0–10 |
| $MnO$ | 0–2 |
| $Sm_2O_3$ | 0–2 |
| $Gd_2O_3$ | 0–2 |
| $Y_2O_3$ | 0–2 |
| $Dy_2O_3$ | 0–2 | and wherein the total amount of $$Na_2O+K_2O+SiO_2+Al_2O_3$$

(i.e., when any or all are present) is not more than 10 weight percent.

More specific examples of glass compositions within the group described in the preceding paragraph are those consisting essentially of the following oxides in approximately the specified weight percentages:

Glass composition H:

| | |
|---|---|
| $CaO$ | 28 |
| $B_2O_3$ | 67 |
| $SiO_2$ | 5 |
| $MnO$, $Sm_2O_3$, $Gd_2O_3$, $Y_2O_3$ or $Dy_2O_3$ | a 0.05–1.5 |

Glass composition I:

| | |
|---|---|
| $CaO$ | 15 |
| $B_2O_3$ | 80 |
| $Na_2O$ | 5 |
| $MnO$, $Sm_2O_3$, $Gd_2O_3$, $Y_2O_3$ or $Dy_2O_3$ | a 0.05–1.5 |

Glass Composition J:

| | |
|---|---|
| $CaO$ | 15 |
| $B_2O_3$ | 75 |
| $SiO_2$ | 5 |
| $Na_2O$ | 5 |
| $MnO$, $Sm_2O_3$, $Gd_2O_3$, $Y_2O_3$ or $Dy_2O_3$ | a 0.05–1.5 |

Glass composition K:

| | |
|---|---|
| $CaO$ | 15 |
| $B_2O_3$ | 79 |
| $Al_2O_3$ | 1 |
| $Na_2O$ | 5 |
| $MnO$, $Sm_2O_3$, $Gd_2O_3$, $Y_2O_3$ or $Dy_2O_3$ | a 0.05–1.5 | a Preferably 0.1–1.0.

By controlled heat treatment of the surface-crystallizable glasses described in the two preceding paragraphs, there are obtained luminescent, especially cathodoluminescent, glass bodies or structures having a crystalline-containing, more particularly a calcium borate-type crystalline-containing, surface layer formed in situ; that is, a surface-crystallized layer of glass holding an in situ-formed phosphor material.

Other examples of calcium borate-type glasses which, in their surface-crystallized state, can be treated with an alkaline solution in accordance with the instant invention to increase their cathodoluminescent brightness are given in my copending application Ser. No. 504,068, filed Oct. 23, 1965 concurrently herewith and assigned to the same assignee as the present invention, and which by this cross-reference is made a part of the disclosure of the instant application.

From the foregoing description of the various groups, sub-groups and species of surface-crystallizable glasses that can be surface-crystallized and then treated with an alkaline solution to increase their cathodoluminescent brightness, numerous other examples of compositions of glass articles, such as cathodoluminescent screens, containing or having a surface-crystallized layer of glass holding an in situ-formed phosphor material will be apparent to those skilled in the art.

The cathodoluminescent surface-crystallized glasses that are treated in accordance with this invention include those obtained by a controlled heat treatment of a surface-crystallizable (including potentially surface-crystallizable) glass that may have been roughened on at least some of the exposed surfaces thereof thereby to introduce nucleating centers that will initiate the growth of crystals in said exposed surfaces which normally can be crystallized in situ only when a sufficient amount of added nucleating agent is present. Roughening may be effected by grinding, sand-blasting, shotblasting, etching, "vapor" honing, or by any other suitable means. "Vapor" honing is effected by spraying a slurry of finely divided abrasive particles such as silica, alumina, silicon carbide, etc., suspended or dispersed in a liquid carrier, e.g., water, upon the glass surface to be roughened.

The aforementioned roughening treatment is such as will provide a frosted (including frosted-like) surface upon clear, uncolored glass that has been subjected to this treatment. When such a surface is obtained light scattering is effected, and the "valleys" and "ridges" that are produced have sharp or relatively sharp angles rather than rounded edges or rounded projections and depressions. Equivalent roughening treatments may be applied to translucent or opaque glasses. The roughening treatment may be applied to the unannealed glass if it is sufficiently strong to withstand handling and roughening; or to the annealed glass.

The glass with its roughened exposed surfaces is then subjected to a controlled heat treatment that extends through its annealing temperature or range to a higher temperature approaching but not substantially above its Littleton softening point, e.g., temperatures ranging from 1000°–1200° F. at initial heating upward to a maximum of about 1900°–2000° F. or higher, and heat-treating times ranging from a few seconds to 24 hours or more.

Additional and more detailed information on glasses that may be subjected to the aforesaid roughening treatment, the roughening techniques employed, the heat-treating conditions in effecting surface-crystallization of the roughened glasses, etc., are given in my copending application Ser. No. 486,191 filed Sept. 9, 1965, assigned to the same assignee as the present invention, and which by this cross-reference is made a part of the disclosure of the instant application. In this copending application there is disclosed and claimed the method which includes the step of roughening at least some of the exposed surfaces of a potentially surface-crystallizable glass in order to introduce nucleating centers that initiate the growth of crystals in exposed surfaces of the said glass.

Reference is also made to my aforementioned copending application Ser. No. 486,215; 486,197 and 504,068 for detailed information on the controlled heat treatment to which the surface-crystallizable glasses disclosed in the respective applications are subjected in order to effect surface-crystallization thereof and thereby obtain a cathodluminescent surface-crystallized glass that can be treated in accordance with the present invention in order to improve the cathodoluminescent brightness thereof.

The copending applications identified in the preceding paragraph also give detailed information for coating the surface-crystallizable or the surface-crystallized glass with solutions of a metallic salt, e.g., zinc acetate, with or without an activator, e.g., manganous acetate, followed by controlled heat treatment to obtain the desired cathodoluminescent glass. A single or a plurality of different phosphor films or layers may be applied in this way, followed by controlled heat treatment after the application of each coating. A treatment with an alkaline solution in accordance with this invention may be applied, as desired or as may be required, after each or after two or more of the aforesaid coatings have been deposited by spraying or otherwise upon the glass, followed by the aforementioned heat treatment.

In order that those skilled in the art may better understand how the persent invention can be carried into effect, the following examples are given by way of illustration and not by way of limitation. All parts and percentages are by weight unless otherwise stated.

Example 1

A cast sample of glass composition A, about 2 inches wide and 9 inches long, is annealed by heating to a temperature of about 1225° F., held at that temperature for about 15 minutes, and then allowed to cool slowly to ambient temperature (about 20°–30° C.). The annealed specimen is roughened on one surface by holding it against a revolving cast-iron wheel over which 240-mesh grit, specifically silicon carbide, suspended in water is flowing. In roughening the exposed surface of the specimen maximum effort is made to obtain a continuous roughened surface, and to secure the frosted-like appearance hereinbefore described. The extent of roughening is sufficient to remove all of the "as cast" surface of the glass. The thickness of the roughened glass is about 0.2 inch.

A spray-coating composition is prepared by dissolving 1 gram of zinc acetate, $Zn(C_2H_3O_2)_2 \cdot 2H_2O$, in 99 grams of methanol. The roughened glass specimen is heated to about 300° F., and then spray-coated with the zinc acetate solution making 12 passes with a De Vilbiss spray gun (Series 502). This results in the formation of a very thin coating of zinc acetate on the surface of the glass.

The coated glass specimen is then heated to 1650° F., and held at that temperature for 2 hours, after which it is allowed to cool to room temperature. The heat treatment effects surface-crystallization of the glass. X-ray examination shows the presence of crystalline, manganese-activated zinc orthosilicate in the glass surface. The glass sample luminesces green under 2 to 5 kv. electron bombardment.

The surface-crystallized sample is cut into parts, and the backside of each part is ground and polished. One part is used as a control specimen. Another part of the surface-crystallized sample is immersed in 6-normal aqueous NaOH at 160° F. for 3 minutes, while a third part is immersed in the same solution for 6 minutes. The treated samples are washed with distilled water to remove the alkaline-treating solution, and then dried. The results of cathodoluminescent brightness tests in foot-lamberts are as follows:

2 kv. 200 μa./in.²
Control, ft.-L _____ 96
After 3 minutes in NaOH solution, ft.-L _____ 132
After 6 minutes in NaOH solution, ft.-L _____ 137

From the foregoing it is seen that nearly a 43% increase in cathodoluminescent brightness is obtained after 6 minutes' immersion in the 6-normal aqueous NaOH solution.

Example 2

Part of Example 1 (immersion time of 6 minutes) is repeated with the exception that the application of a coating of 1% zinc acetate in methanol is omitted. The results of cathodoluminescent brightness tests in foot-lamberts are as follows:

|  | 2 kv. 200 μa./in.² |
|---|---|
| Control, ft.-L | 2.7 |
| After 6 minutes in NaOH solution, ft.-L | 4.9 |

The NaOH-treated sample showed an increase in cathodoluminescent brightness of 81.5% over that of the control specimen.

Instead of using 6 N NaOH as in Examples 1 and 2 similar results are obtained by using 3 N NaOH and a longer immersion time, e.g., from 10 to 20 minutes.

Example 3

A sample of glass composition A, which has been heat-treated as described in Example 1 to produce a green luminescing crystallized surface skin, is immersed for 3 minutes in 6 N aqueous KOH solution at about 160° F., rinsed with distilled water and dried. The results of cathodoluminescent brightness tests on two control samples and on the treated sample are as follows:

|  | 2 kv. 100 μa./in.² |
|---|---|
| Control A, ft.-L | 20 |
| Control B, ft.-L | 21 |
| KOH-treated sample, ft.-L | 37 |

The KOH-treated sample showed an increase in cathodoluminescent brightness approximately 80% more than that of the average brightness value for the two control specimens.

Similar results are obtained when ammonium hydroxide (commercial grade) is substituted for potassium hydroxide in treating the glass. Lower temperatures and longer immersion periods may be used in such cases, e.g., 120°–130° F., to decrease the amount of ammonia evolved during the treating period.

The most persistent and reproducible thin-film phosphor is a cubic spinel phase formed on surface-crystallizable glasses sprayed with metallic salt, specifically metallic acetate, solutions and heat-treated above 1500° F. The diffraction patterns from these thin films closely match the reported pattern for the $Mn_3O_4$ spinel, even in the apparent absence of manganese. Since the thickness of these films is less than one micron, it is impossible to identify the chemical composition by presently available techniques. By changing the chemical spray solution or the heat-treatment time and temperatures, it is possible to produce many different luminescent phosphors with the same spinel surface structure. Thus, glass A, for instance, can be used as a substrate to produce most of the colors through the spectrum. This is illustrated by the following example.

Example 4

Except as noted hereafter the same glass composition and the same procedure are employed as in Example 1. When a 1% methanol solution of barium acetate is substituted for a similar solution of calcium acetate and the heat treatment is at 1650° F., a surface-crystallized glass having an in situ-formed phosphor that luminesces red under low-voltage electron bombardment is obtained. Using the same zinc acetate solution as in Example 1 and heat-treating at 1500° F. yields an in situ-formed phosphor that produces a yellow luminescence under low-voltage electron bombardment. The same samples when heat-treated at 1650° F. cathodoluminesce bright green. A glass composition that is the same as that of glass A except that it contains no manganese, when sprayed with a 1% methanol solution of zinc acetate and heat-treated at 1650° F. as in Example 1, luminesces blue under electron bombardment.

Controls of each of the aforementioned glasses and corresponding specimens treated by immersion for 3 minutes and 6 minutes in 6-normal aqueous NaOH at 160° F., followed by washing in distilled water and drying, are tested for their cathodoluminescent brightness. All of the treated samples show increased brightness values as compared with the controls when tested as described under Example 1.

Illustrative examples of other glasses that may be substituted in the foregoing examples for the particular glass employed in the individual example are glasses B, C, D or E; glass F containing 0.5% MnO; glass G containing 2.0% $TiO_2$; or glasses H, I, J or K. The compositions of all of these glasses have been given in the portion of this specification prior to the examples.

I claim:

1. The method of increasing the cathodoluminescent brightness, under electron bombardment, of a glass screen having a surface-crystallized layer of glass containing an in situ-formed phosphor which comprises contacting the said glass with an alkaline solution selected from the group of alkali-metal hydroxide and ammonium hydroxide, at a temperature and for a period of time sufficient to increase its cathodoluminescent brightness after the excess alkaline solution has been removed therefrom, the alkaline solution having a concentration effective to increase the cathodoluminescent brightness; and removing excess alkaline solution from the treated glass.

2. The method as in claim 1 wherein the alkaline solution employed is one having a basicity at least the equivalent of that of a 1-normal aqueous solution of sodium hydroxide.

3. The method as in claim 1 wherein the alkaline solution is an aqueous solution of sodium hydroxide having a normality between 3 and 9; contacting is effected by immersing the glass in the said solution; and the temperature of the solution while the glass is immersed therein is within the range of from about 120° F. to about 200° F.

4. The method as in claim 3 wherein the aqueous solution of sodium hydroxide has a normality of about 6; the temperature of the solution while the glass is immersed therein is within the range of from about 150° F. to about 170° F.; and the time the glass is immsered in the said solution is from 15 seconds to 10 minutes.

5. The mtehod as in claim 1 wherein the glass of which the glass screen is comprised is produced by the controlled heat treatment of a surface-crystallizable glass consisting essentially of the following constituents calculated in weight percent on the oxide basis:

| | |
|---|---|
| $SiO_2$ | 40–60 |
| $Al_2O_3$ | 5–15 |
| ZnO | 15–35 |
| CaO | 0–24 |
| BaO | 0–20 |
| SrO | 0–10 |
| MgO | 0–10 |
| $Na_2O$ | 0–8 |
| $K_2O$ | 0–8 |
| $Li_2O$ | 0–2 | wherein the total $Na_2O+K_2O+Li_2O$ is no more than 8 weight percent, the total CaO+BaO+SrOMgO is within the range of from 6 to 36 weight percent and, when the total $Na_2O+K_2O+Li_2O$ is zero, then the total CaO+BaO+SrO is at least 6 weight percent.

6. The method as in claim 1 wherein the glass of which the glass screen is comprised is produced by the controlled heat treatment of a surface-crystallizable glass consisting essentially of the following constituents calculated in approximate weight percent on the oxide basis:

| | |
|---|---|
| $SiO_2$ | 50.8 |
| $AlO_3$ | 8.2 |
| ZnO | 22.0 |
| CaO | 18.0 |
| SrO | 0.5 |
| $Li_2O$ | 0.5 |
| MnO | 0.5 | and the excess alkaline solution is removed from the treated glass by washing with water and/or a lower alkanol.

7. The method of increasing the cathodoluminescent brightness, under electron bombardment, of glass screen having a surface-crystallized layer of glass containing an in situ-formed phosphor, said glass being produced by the controlled heat treatment of the surface-crystallizable glass defined in claim 5, and said method comprising immersing the said glass in an aqueous solution of sodium hydroxide having a normality between 3 and 9, the temperature of the solution while the glass is immersed therein being within the range of from about 120° F. to about 200° F., and the time the glass is immersed in the said solution being from 1 second to 1 hour, the shorter periods of time being used at the higher temperatures; and removing the excess sodium hydroxide solution from the treated glass by water-washing.

8. The method of increasing the cathodoluminescent brightness, under electron bombardment, of a glass screen having a surface-crystallized layer of glass containing an in situ-formed phosphor, said glass being produced by the controlled heat treatment of the surface-crystallizable glass defined in claim 6, and said method comprising immersing the said glass in an aqueous solution of sodium hydroxide having a normality of about 6, the temperature of the solution while the glass is immersed therein being about 160° F., and the time the glass is immersed in the said solution being from about 3 to about 6 minutes; and removing the excess sodium hydroxide solution from the treated glass by water-washing.

9. The method as in claim 8 wherein potassium hydroxide having a normality of about 6 is used in place of sodium hydroxide.

References Cited

UNITED STATES PATENTS

| 2,325,110 | 7/1943  | Colborne       | 117—33 XR |
| 2,523,026 | 9/1950  | Jones          | 252—301.4 |
| 2,575,755 | 11/1951 | Froelich et al.| 252—301.4 |
| 3,060,129 | 10/1962 | Hockstra et al.| 252—301.4 |

ALFRED L. LEAVITT, Primary Examiner

W. F. CYRON, Assistant Examiner

U.S. Cl. X.R.

252—301